US011347870B2

(12) United States Patent
Smith et al.

(10) Patent No.: US 11,347,870 B2
(45) Date of Patent: May 31, 2022

(54) TECHNOLOGIES FOR SECURELY PROVIDING REMOTE ACCELERATORS HOSTED ON THE EDGE TO CLIENT COMPUTE DEVICES

(71) Applicant: Intel Corporation, Santa Clara, CA (US)

(72) Inventors: Ned M. Smith, Beaverton, OR (US); Brinda Ganesh, Portland, OR (US); Francesc Guim Bernat, Barcelona (ES); Eoin Walsh, Shannon (IE); Evan Custodio, North Attleboro, MA (US)

(73) Assignee: INTEL CORPORATION, Santa Clara, CA (US)

( * ) Notice: Subject to any disclaimer, the term of this patent is extended or adjusted under 35 U.S.C. 154(b) by 308 days.

(21) Appl. No.: 16/369,042

(22) Filed: Mar. 29, 2019

(65) Prior Publication Data

US 2019/0228166 A1    Jul. 25, 2019

(51) Int. Cl.
*H04L 9/32* (2006.01)
*G06F 21/60* (2013.01)
*H04L 9/40* (2022.01)
*H04L 41/5003* (2022.01)
*H04L 9/08* (2006.01)
*H04L 67/01* (2022.01)

(52) U.S. Cl.
CPC .......... *G06F 21/602* (2013.01); *H04L 9/0827* (2013.01); *H04L 41/5003* (2013.01); *H04L 63/045* (2013.01); *H04L 63/0428* (2013.01); *H04L 63/0485* (2013.01); *H04L 67/42* (2013.01)

(58) Field of Classification Search
CPC . G06F 21/602; H04L 9/0827; H04L 41/5003; H04L 63/0428; H04L 63/045
USPC ......................................................... 713/164
See application file for complete search history.

(56) References Cited

U.S. PATENT DOCUMENTS

| 7,020,160 | B1 * | 3/2006 | Achler | H03M 7/30 |
| | | | | 370/466 |
| 10,909,069 | B2 * | 2/2021 | Haviv | G06F 16/27 |
| 2005/0276413 | A1 * | 12/2005 | Neogi | H04L 63/0428 |
| | | | | 380/28 |

(Continued)

OTHER PUBLICATIONS

Robert Pettersen; Secure Edge Computing with ARM Trustzone; scitepress.org; 2017; p. 102-109.*

*Primary Examiner* — Monjur Rahim
(74) *Attorney, Agent, or Firm* — Hanley, Flight & Zimmerman, LLC (57) ABSTRACT

Technologies for securely providing one or more remote accelerators hosted on edge resources to a client compute device includes a device that further includes an accelerator and one or more processors. The one or more processors are to determine whether to enable acceleration of an encrypted workload, receive, via an edge network, encrypted data from a client compute device, and transfer the encrypted data to the accelerator without exposing content of the encrypted data to the one or more processors. The accelerator is to receive, in response to a determination to enable the acceleration of the encrypted workload, an accelerator key from a secure server via a secured channel, and process, in response to a transfer of the encrypted data from the one or more processors, the encrypted data using the accelerator key.

21 Claims, 5 Drawing Sheets

(56) References Cited

U.S. PATENT DOCUMENTS

| | | | |
|---|---|---|---|
| 2007/0016694 A1* | 1/2007 | Achler | H03M 7/3088 709/247 |
| 2007/0038853 A1* | 2/2007 | Day | H04L 63/0823 713/153 |
| 2008/0076425 A1* | 3/2008 | Khetawat | H04W 88/12 455/436 |
| 2014/0068259 A1* | 3/2014 | Resch | H04L 9/0861 713/167 |
| 2014/0094159 A1* | 4/2014 | Raleigh | H04W 24/02 455/418 |
| 2014/0304505 A1* | 10/2014 | Dawson | H04L 63/0428 713/165 |
| 2016/0057121 A1* | 2/2016 | Metsala | H04L 63/08 713/175 |
| 2016/0373416 A1* | 12/2016 | Burger | H04L 9/3234 |
| 2017/0228258 A1* | 8/2017 | Shifman | G06F 9/5027 |
| 2018/0027018 A1* | 1/2018 | McErlane | H04L 9/0872 713/152 |
| 2018/0332012 A1* | 11/2018 | Koster | H04L 9/0894 |
| 2019/0220601 A1* | 7/2019 | Sood | G06F 21/85 |
| 2019/0228166 A1* | 7/2019 | Smith | H04L 67/10 |
| 2020/0244582 A1* | 7/2020 | Li | H04L 47/32 |

\* cited by examiner

TECHNOLOGIES FOR SECURELY PROVIDING REMOTE ACCELERATORS HOSTED ON THE EDGE TO CLIENT COMPUTE DEVICES

BACKGROUND

Typically a compute device may execute an application using resources that are local to the compute device, such as a general purpose processor and/or one or more accelerator devices (e.g., devices capable of executing a set of operations faster than the general purpose processor). In some scenarios, a compute device may encounter a section of an application that should be performed within a certain set of parameters (e.g., the section is particularly sensitive to latency, such as a section that is to make decisions based on real time computer vision data, and should be performed within a particular time period) but is unable to satisfy those parameters due to limitations of the compute device. For example, the compute device might not be equipped with a fast enough general purpose processor or an appropriate accelerator device, or the compute device may not have enough energy stored in its battery to execute the section within the specified time period (e.g., utilizing the accelerator device would deplete the remaining energy in the battery).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
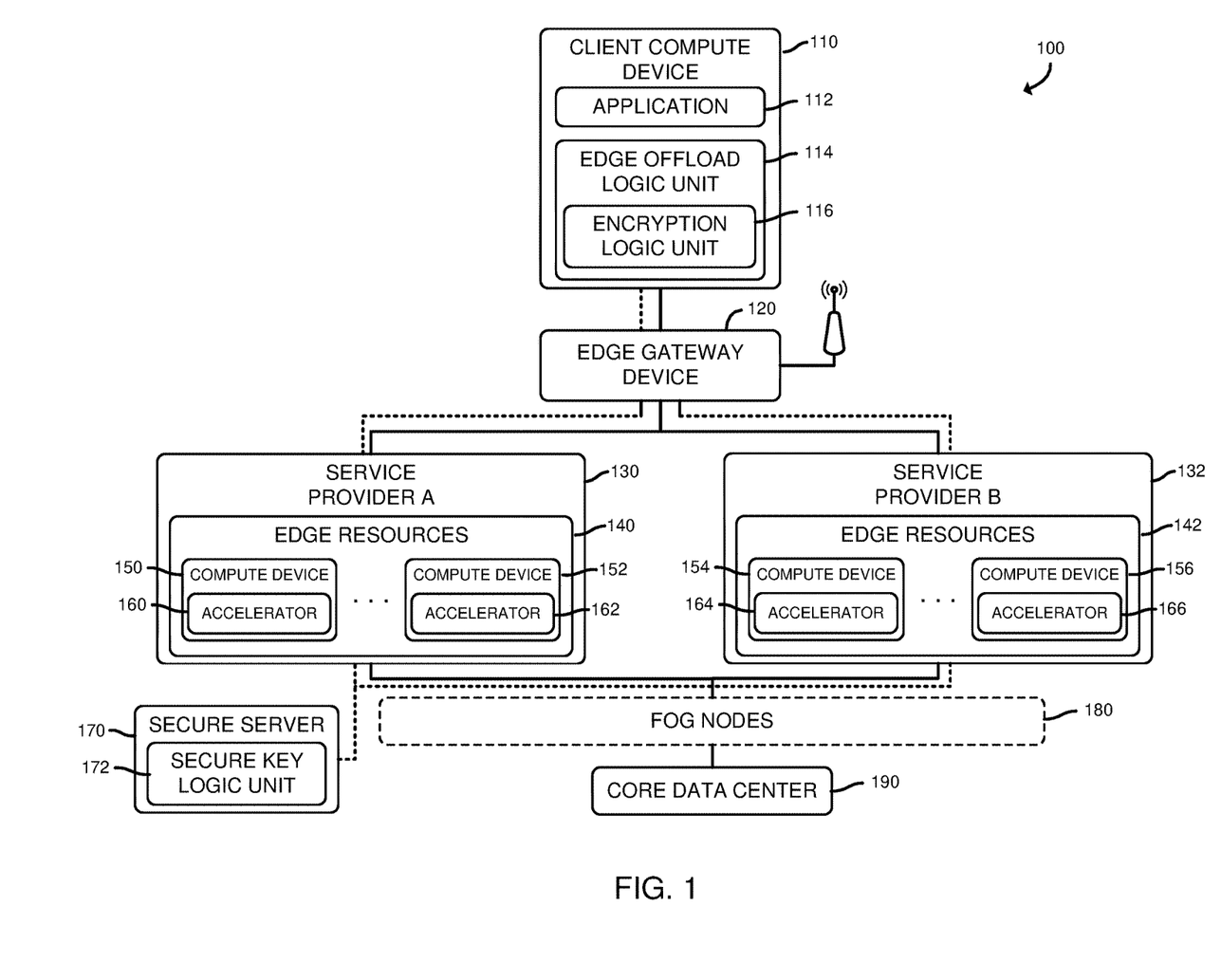
FIG. 1 is a simplified diagram of at least one embodiment of a system for securely providing one or more remote accelerators hosted on an edge infrastructure to a client compute device.

Referring now to FIG. 1, a system 100 for securely providing one or more remote accelerators hosted on edge resources to a client compute device includes a client compute device 110 in communication one or more edge resources 140, 142 via an edge gateway device 120. In use, the client compute device 110 may offload a workload of an application that is to be executed by the client compute device 110 to one or more accelerator devices 160, 162, 164, 166 of the edge resources 140, 142. To securely offload the workload, the client compute device 110 may send a message to a secure server 170 on an edge network requesting the offload of workload to one or more accelerator devices 160, 162, 164, 166. In response to a receipt of the request, the secure server 170 may generate cryptographic keys (e.g., a client key and an accelerator key) to be used to securely transfer the workload from the client compute device 110 to the accelerator device 160, 162, 164, 166. To do so, the client compute device 110 may encrypt the workload using the client key received from the secure server 170. Concurrently or simultaneously, the respective accelerator 160, 162, 164, 166 may also receive an accelerator key that corresponds to the client key from the secure server 170 with a tenant ID of the client compute device 110 that is requesting the workload acceleration via an authenticated channel. As such, when the accelerator 160, 162, 164, 166 receives the encrypted workload from the client compute device 110, the accelerator 160, 162, 164, 166 may use the accelerator key to read, decrypt, and process the encrypted workload. This allows the client compute device 110 to securely transmit the workload directly to the accelerator device 160, 162, 164, 166 of the edge resources without exposing the content of the workload to the edge compute device 150, 152, 154, 156 hosting the accelerator device 160, 162, 164, 166.

The edge gateway device 120 may be embodied as any device capable of communicating data between the client compute device 110 and one or more edge resources 140, 142 (e.g., resources, such as compute devices and the components thereof, owned and/or operated by one or more service providers, such as cellular network operators) or other compute devices located in a cloud. Further, the edge gateway device 120, in the illustrative embodiment, is configured to receive and respond to requests from the client compute device 110 regarding characteristics of the edge resources 140, 142, such as architectures of processors, accelerator devices, and/or other components in the edge resources 140, 142 (e.g., in compute devices 150, 152, 154, 156), latencies, power usage, and costs (e.g., monetary costs) associated with utilizing those edge resources 140, 142. The edge gateway device 120 and the edge resources 140, 142, in the illustrative embodiment, are positioned at one or more locations (e.g., in small cell(s), base station(s), etc.) along the edge (e.g., in an edge network) of a cloud.

The edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes 180), which may be embodied as a system-level horizontal architecture that distributes resources and services of computing, storage, control and networking anywhere between a core data center 190 (e.g., a data center that is further away from and in a higher level of a hierarchy of the system 100 than the edge resources 140, 142, and that includes multiple compute devices capable of executing one or more services (e.g., processes on behalf of one or more clients)) and an endpoint device (e.g., the client compute device 110).

As discussed in more detail herein, the client compute device 110, in operation, executes an application 112 (e.g., using a processor and/or accelerator device(s)) included in the client compute device 110. Further, in the illustrative embodiment, the client compute device 110 includes an edge offload logic unit 114, which may be embodied as any device or circuitry (e.g., a processor, an application specific integrated circuit (ASIC), reconfigurable circuitry, etc.) configured to determine whether to offload a workload of an application to be executed by the client compute device 110 to one or more accelerator devices 160, 162, 164, 166 of the edge resources 140, 142. To do so, the edge offload logic unit 114 further includes an encryption logic unit 116, which may be embodied as any device or circuitry (e.g., a processor, an application specific integrated circuit (ASIC), reconfigurable circuitry, etc.) configured to send a request to the secure server 170 in response to a determination to offload the workload to one or more accelerator devices 160, 162, 164, 166 of the edge compute devices 150, 152, 154, 156, receive a client key (i.e., a cryptographic key) from the secure server 170 in response to the request, and encrypt the workload to be offloaded to one or more accelerator devices 160, 162, 164, 166 using the client key. The edge offload logic unit 114 is further configured to offload the encrypted workload to one or more accelerator devices 160, 162, 164, 166 of the edge compute devices 150, 152, 154, 156 (e.g., by sending the encrypted workload to the edge gateway device 120 for distribution to the edge resource(s) hosting the corresponding accelerator devices).

The secure server 170 may be embodied as one or more physical compute devices or a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer). The secure server 170 may be embodied as any device or circuitry (e.g., a processor, a co-processor, reconfigurable circuitry, a field programmable gate array (FPGA), an application specific integrated circuit (ASIC), or virtualized version thereof, etc.) configured to receive a request from the client compute device 110 to use one or more accelerator devices 160, 162, 164, 166 of the edge resources 140, 142, generate cryptographic keys (e.g., a client key and an accelerator key) in response to a receipt of the request, transmit the client key to the encryption logic unit 116 of the client compute device 110, and transmit the accelerator key to an accelerator device 160, 162, 164, 166 that is to process the requested workload via an authenticated channel. It should be appreciated that, in some embodiments, the client key and the accelerator key may be the same (e.g., a symmetric key). In other embodiments, the client key and accelerator key may be different (e.g., the client key may be a public key and the accelerator key may be a private key). Alternatively, in other embodiments, both the shared symmetric key and the asymmetric keys may be used. For example, the secure server 170 may bundle a symmetric key targeting the accelerator into a message (also referred to as a ticket). The secure server 170 may further send the ticket and the asymmetric public key of the accelerator 160 to the client compute device 110 and the asymmetric private key to the accelerator 160. The client compute device 110 may decrypt its copy of the shared symmetric key using the asymmetric public key. Subsequently, the client compute device 110 may encrypt the workload using the asymmetric public key then send the ticket and the encrypted workload to the accelerator device 160. The accelerator device 160 may decrypt its copy of the shared symmetric key using the asymmetric private key and decrypt the encrypted workload using the shared symmetric key. This process ensures that the shared symmetric key is only shared between the client compute device 110 and the accelerator device 160. It should be appreciated that, in some embodiments, the secure server 170 may form a portion of the fog node 180, the core data center 190, or the edge gateway device 120.

Figure 2:
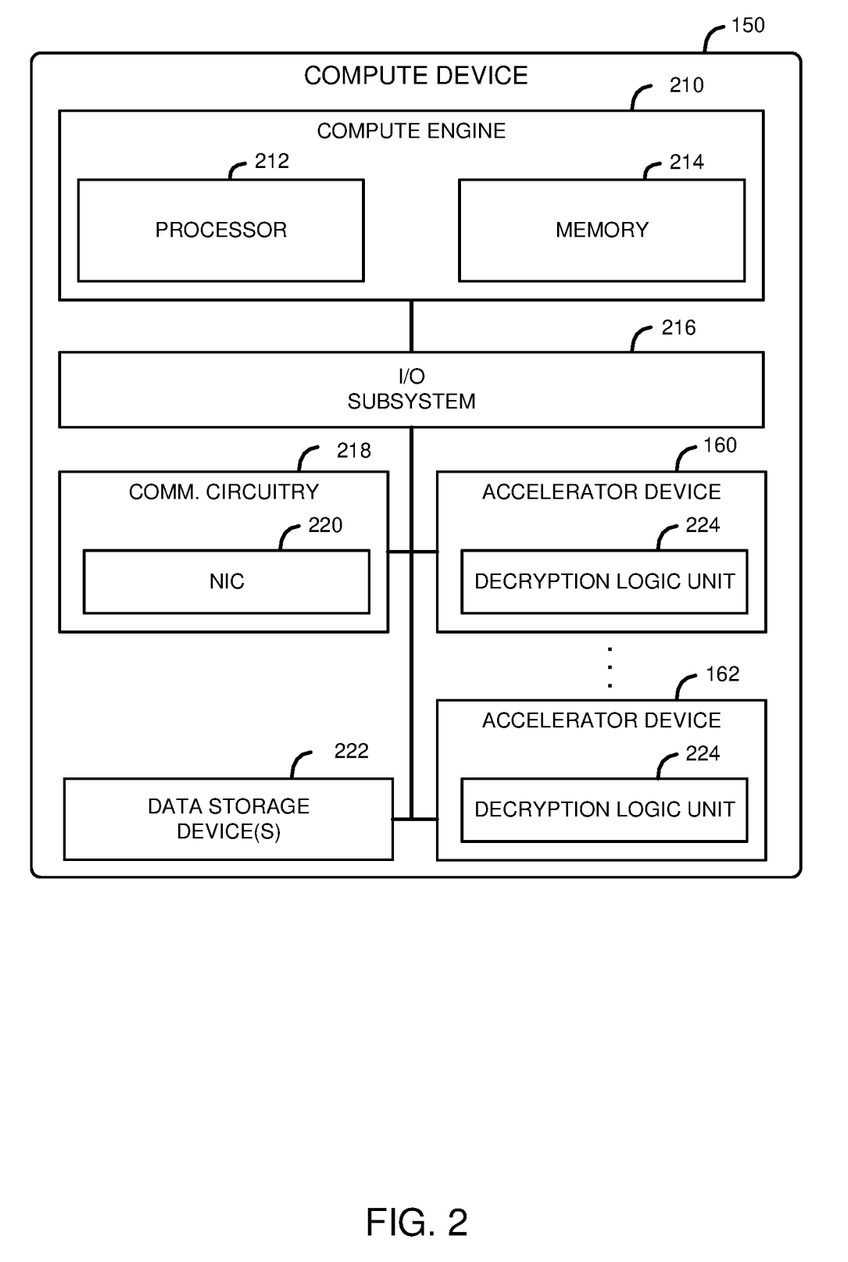
FIG. 2 is a simplified block diagram of at least one embodiment of the client compute device included in the system of FIG. 1.

Referring now to FIG. 2, the illustrative edge compute device 150 includes a compute engine (also referred to herein as "compute engine circuitry") 210, an input/output (I/O) subsystem 216, communication circuitry 218, and one or more data storage devices 222. As described herein, the edge compute device 150 further includes one or more accelerator devices 160, 162. It should be appreciated that, in other embodiments, the edge compute device 150 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein (e.g., executing one or more sections of the application 112). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications (the application 112), data operated on by the application(s), libraries, and drivers.

The compute engine 210 is communicatively coupled to other components of the edge compute device 150 via the I/O subsystem 216, which may be embodied as circuitry and/or components to facilitate input/output operations with the compute engine 210 (e.g., with the processor 212 and/or the main memory 214) and other components of the edge compute device 150. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the edge compute device 150, into the compute engine 210.

The communication circuitry 218 may be embodied as any communication circuit, device, or collection thereof, capable of enabling communications over a network between the edge compute device 150 and another compute device (e.g., the edge gateway device 120, the edge resources 140, 142, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the edge compute device 150 to connect with another compute device (e.g., the edge gateway device 120, the edge resources 140, 142, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the edge compute device 150 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 160, 162 may be embodied as any device(s) or circuitries configured to execute a set of operations faster than the processor 212 is capable of executing the operations. The accelerator device(s) 160, 162 may include one or more field programmable gate arrays (FPGAs), each of which may be embodied as a set (e.g., a matrix) of logic gates that can be configured to perform a set of operations according to a defined configuration (e.g., a bit stream). The accelerator device(s) 160, 162 may additionally or alternatively include a graphics processing unit (GPU), which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 160, 162 may include a vision processing unit (VPU), which may be embodied as any device or circuitry (e.g., a programmable logic chip, a processor, etc.) configured to perform operations related to machine vision, machine learning, and artificial intelligence.

In the illustrative embodiment, each accelerator device 160, 162 further includes a decryption logic unit 224, which may be embodied as any device or circuitry configured to receive an accelerator key from the secure server 170 with a tenant ID of the client compute device 110 that is requesting workload acceleration via an authenticated channel and read, decrypt, and process the encrypted workload using the accelerator key. In some embodiments, the decryption logic unit 224 may further update a key storage table in response to a receipt of the accelerator key and the tenant ID. Each entry of the key storage table includes an accelerator key and a tenant ID of a client compute device 110 that the client key associated with the accelerator key was assigned to. In some embodiments, the key storage table may also include a process address space id (PASID). The key storage table may be used to keep track of the accelerator key and the client key pair when the accelerator device 160 receives encrypted workloads from more than one client compute device. In such embodiments, the accelerator device 160 may determine which accelerator key to use to process the encrypted data received from a client compute device 110.

It should be appreciated that, although FIG. 2 illustrates the edge compute device 150, other edge compute devices 152, 154, 156 have components similar to those described in FIG. 2 with reference to the edge compute device 150. Additionally, the edge resources 140, 142, the edge gateway device 120, the fog nodes 180, and the core data center 190 may also have components similar to those described in FIG. 2 with reference to the edge compute device 150. The description of those components of the edge compute device 150 is equally applicable to the description of components of the edge resources 140, 142, the edge gateway device 120, the fog nodes 180, and the core data center 190, with the exception that, in some embodiments, the edge offload logic unit 114 may be included in the client compute device 110. Further, it should be appreciated that any of the edge resources 140, 142, the edge gateway device 120, the fog nodes 180, and the core data center 190 may include other components, sub-components, and devices commonly found in a computing device, which are not discussed above in reference to the edge compute device 150 and not discussed herein for clarity of the description. Further, it should be understood that one or more components of a compute device may be distributed across any distance, and are not necessarily housed in the same physical unit.

The client compute device 110, edge resources 140, 142 (e.g., the compute devices 150, 152, 154, 156), the edge gateway device 120, the fog nodes 180, and the core data center 190 are illustratively in communication via a network, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
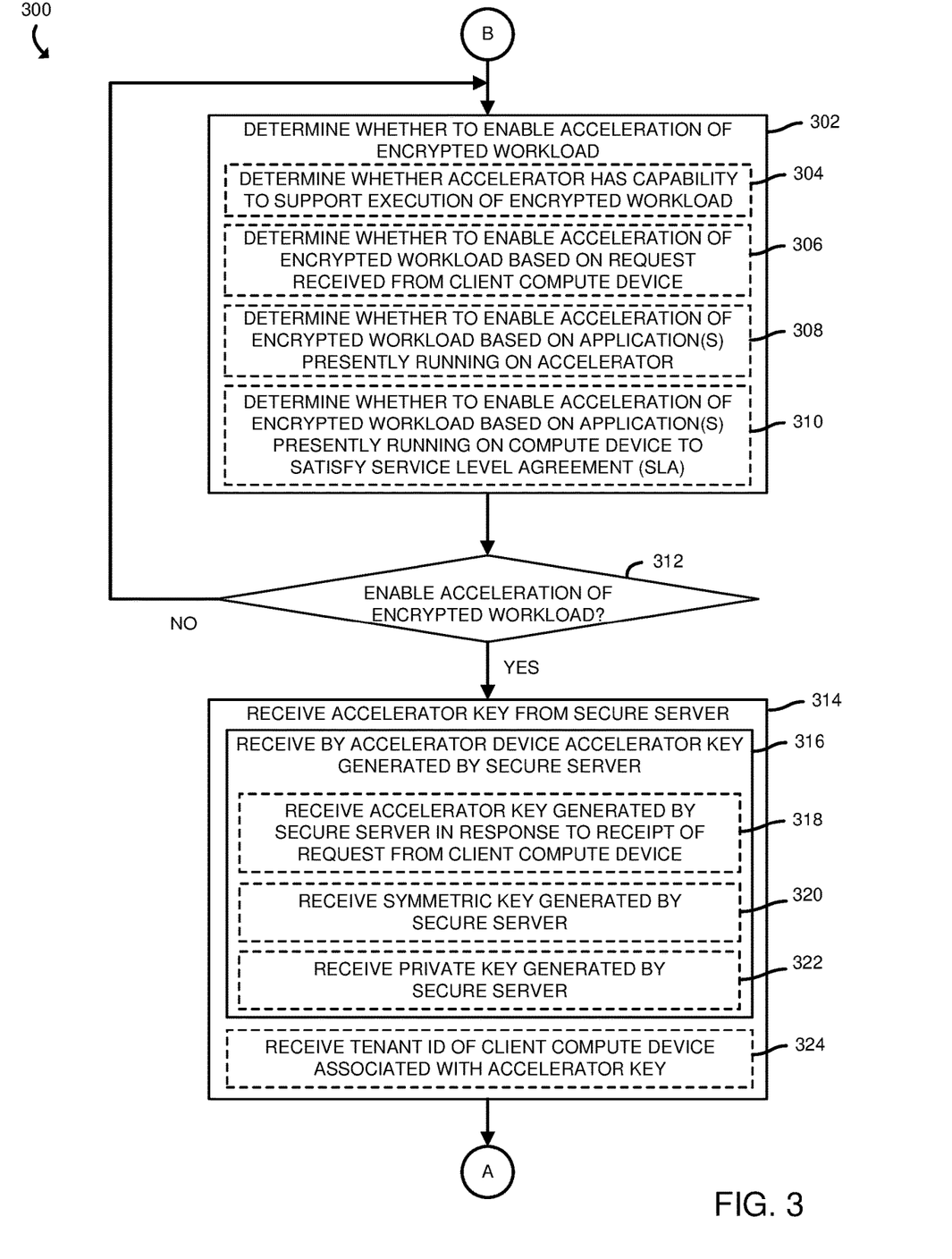
FIGS. 3-4 are a simplified block diagram of at least one embodiment of a method that may be performed by an edge compute device of FIG. 1 for securely providing a remote accelerator of an edge resource to a client compute device.
Figure 4:
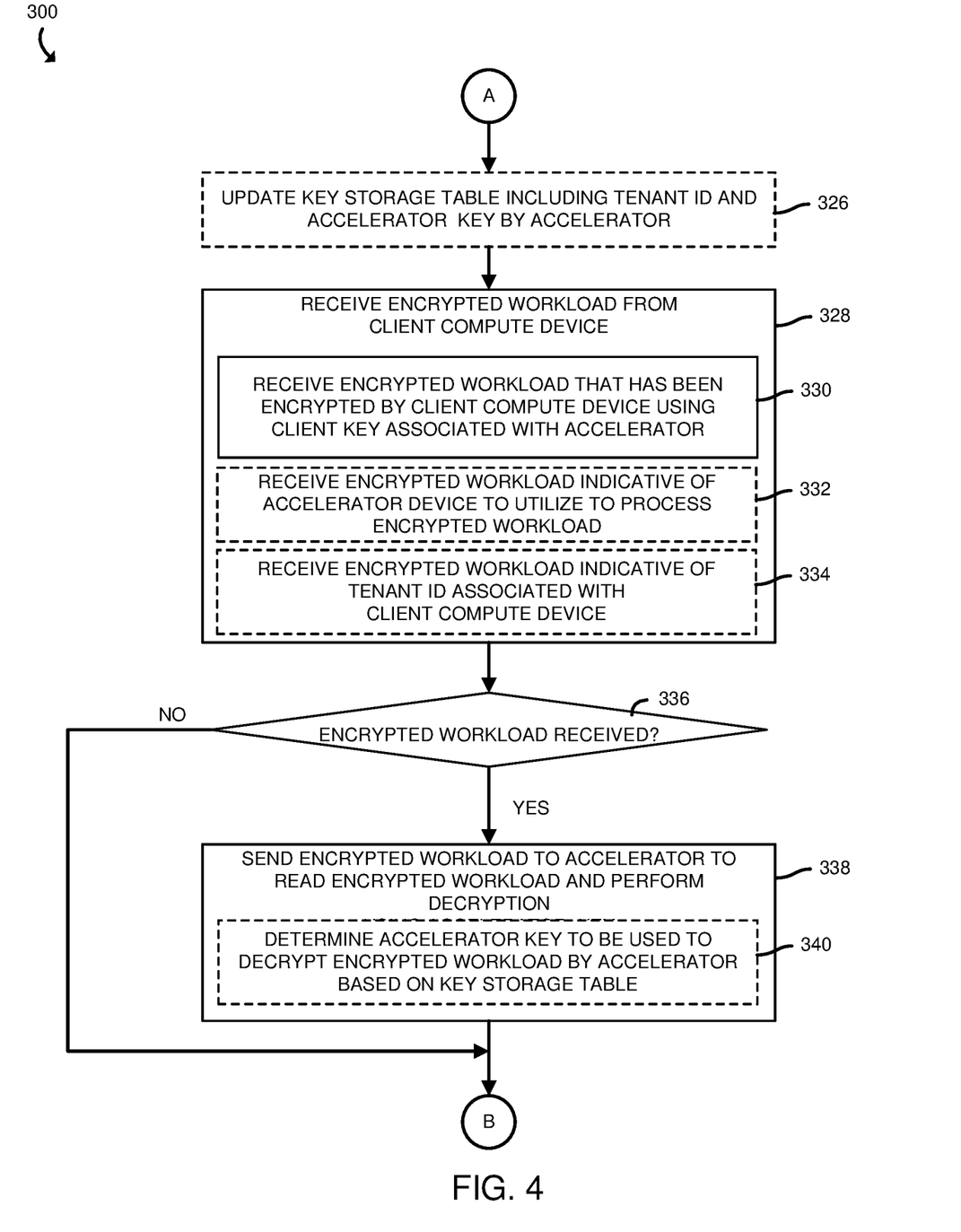

Referring now to FIGS. 3 and 4, the edge compute device 150 of the edge resources 140 located at an edge of a network, in operation, may execute a method 300 for securely providing a remote accelerator hosted on the edge to a client compute device 110. As discussed above, the edge compute device 150 includes one or more accelerator devices 160. It should be appreciated that the operations of the method 300 may be performed by any of the edge compute devices 150, 152, 154, 156 of the edge resources 140, 142 that have at least one accelerator device that is capable of providing acceleration of an encrypted workload.

The method 300 begins with block 302, in which the edge compute device 150 determines whether to enable acceleration of an encrypted workload. To do so, in some embodiments, as indicated in block 304, the edge compute device 150 may determine whether one or more accelerators 160 of the edge compute device 150 has capability to support execution of encrypted workloads. In other words, the edge compute device 150 checks attestation of the accelerator's trusted computing capabilities. For example, attestation may include, and is not limited to, reporting a unique accelerator device identity, a certificate chain or other signed message format. In some embodiments, attestation may include firmware, software, bitstreams, and/or micro-code integrity protections using a digital signature or keyed hash. In other embodiments, attestations may include a trusted computing base (TCB) revision number, also referred to as Security Version Number (SVN), that indicates security states of a mutable TCB where SVN describes its current mutation or generation.

In some embodiments, the edge compute device 150 may determine to enable the acceleration of the encrypted workload based on a request received from a client compute device 110, as indicated in block 306. For example, the edge compute device 150 may send a request to the secure server 170 indicating that an application (e.g., the application 112) running on the client compute device 110 requires acceleration of its workload. Additionally or alternatively, the edge compute device 150 may determine whether to enable the acceleration of the encrypted workload based on one or more application(s) presently running on the accelerator device 160 of the edge compute device 150, as indicated in block 308. For example, the edge compute device 150 may determine that the accelerator device 160 is not capable of acceleration of the encrypted workload if another application workload using a different tenant process is running on the accelerator device 160. In other example, the edge compute device 150 may determine that the accelerator device 160 is not capable of acceleration of the encrypted workload if the other running application workloads have a performance profile that consumes resources needed by the requested workload. Without necessary resources, the workload may be starved and fail to complete within the SLA requirement.

Additionally or alternatively, in block 310, the edge compute device 150 may determine whether to enable the acceleration of the encrypted workload based on one or more application(s) presently running on the accelerator device 160 of the edge compute device 150 to satisfy a service level agreement (SLA). In other words, the performance capabilities of the acceleration device 160 are acceptable given the performance criteria contained in the SLA. It should be appreciated that blocks 306-310 may be performed in response to a determination of successful accelerator attestation described in block 304.

If the edge compute device 150 determines not to enable the acceleration of the encrypted workload in block 312, the method 300 loops back to block 302 to continue determining whether to enable acceleration of the encrypted workload. If, however, the edge compute device 150 determines to enable the acceleration of the encrypted workload, the method 300 advances to block 314.

In block 314, the edge compute device 150 receives an acceleration key from the secure server 170. As described above, the secure server 170 includes the secure key logic unit 172 that is configured to generate cryptographic keys (e.g., a client key and an acceleration key) in response to receiving a request from a client compute device 110. As indicated in block 316, the edge compute device 150 receives an acceleration key generated by the secure server 170. For example, the client compute device 110 may send a request to the secure server 170 to use an accelerator device on the edge network. In response, the secure server 170 generates cryptographic keys (e.g., a client key and an accelerator key), sends the client key to the requesting client device (e.g., the client compute device 110), and sends the accelerator key to the accelerator device 160 of the edge compute device 150 to perform the acceleration via a secured authenticated channel, as indicated in block 318. It should be appreciated that, in some embodiments, the request from the client compute device 110 may indicate one or more accelerator devices 160, 162, 164, 166 that are to be used to process the workload. Alternatively, in some embodiments, the secure server 170 may obtain the availability and capability of the accelerator devices 160, 162, 164, 166 to determine which accelerator device(s) 160, 162, 164, 166 is available and capable of performing the acceleration of the encrypted workload. In other words, in some embodiments, more than one accelerator may be used to perform the acceleration of the encrypted workload. In such embodiments, each accelerator may possess a different symmetric key for identical workload. To ensure that the multiple accelerators do not exfiltrate the client's workload, the accelerators may implement multi-tenant isolation technology, may physically partition resources, or may implement a resource mutex scheme that cleans and reallocates resources when tenant-switch occurs. Additionally, the accelerator may implement memory encryption such as Intel SGX Memory Encryption Envoronment (MEE) or Intel Multi-Key Trusted Memory Encryption (MKTME) where the workload remains encrypted during execution within the accelerator environment.

It should be appreciated that, in some embodiments, the client key and the accelerator key may be the same symmetric key. In such embodiments, the accelerator device 160 receives the symmetric key generated by the secure server 170, as indicated in block 320. Alternatively, in some embodiments, the client key may be an asymmetric public key and the accelerator key may be an asymmetric private key. In such embodiments, the accelerator device 160 receives the asymmetric private key generated by the secure server 170 via an authenticated channel established between the secure server 170 and the accelerator device 160, as indicated in block 322. Alternatively, in other embodiments, both the shared symmetric key and the asymmetric keys may be used. For example, the secure server 170 may bundle a key targeting the accelerator into a message (also referred to as a ticket) and send the ticket and the asymmetric public key of the accelerator to the client compute device 110. The client compute device 110 may decrypt its copy of the shared symmetric key using the asymmetric public key. Subsequently, the client compute device 110 may encrypt the workload using the asymmetric public key then send the ticket and the encrypted workload to the accelerator device 160.

Additionally, in some embodiments, the accelerator device 160 may further receive a tenant ID of the client compute device 110 requesting the acceleration from the secure server 170, as indicated in block 324. It should be appreciated that the tenant ID indicates a particular client compute device 110 that was assigned the client key associated with the accelerator key. In some embodiments, the accelerator device 160 may also receive a process address space id (PASID). Subsequently, in some embodiments, the method 300 advances to block 326 of FIG. 4.

In block 326, in some embodiments, the accelerator device 160 may update a key storage table in response to receiving the accelerator key and the tenant ID. It should be appreciated that the key storage table may be implemented in a resource isolated portion of the accelerator device 160. As described above, in some embodiments, the accelerator device 160 may receive encrypted workloads from more than one client compute device. In such embodiments, the key storage table is used to keep track of the accelerator key and the client key pair, such that the accelerator device 160 can determine which accelerator key to use when encrypted data is received from a client compute device. Each entry of the key storage table includes an accelerator key and a tenant ID of a client compute device 110 that the client key associated with the accelerator key was assigned to. In some embodiments, the key storage table may also include the PASID.

In block 328, the edge compute device 150 receives an encrypted workload from a client compute device. In the illustrative embodiment, the edge compute device 150 receives the encrypted workload that has been encrypted by a client compute device (e.g., the client compute device 110) using the client key associated with the accelerator device 160, as indicated in block 330. The encrypted workload may indicate an accelerator device that is to be utilized to process the encrypted workload, as indicated in block 332. Additionally, in some embodiments, the edge compute device 150 may receive the encrypted workload that indicates a tenant ID associated with the requesting client compute device 110, as indicated in block 334.

If the edge compute device 150 determines that the encrypted data has not been received in block 336, the method 300 loops back to block 302 to continue determining whether to enable the acceleration of an encrypted workload. If, however, the edge compute device 150 determines that the encrypted data has been received, the method 300 advances to block 338.

In block 338, the edge compute device 150 sends the encrypted workload to the accelerator 160 residing in the edge compute device 150 to read the encrypted data and perform the decryption using the accelerator key associated with the requesting client compute device. To do so, in some embodiments, the accelerator device 160 may determine which accelerator key to use to decrypt the encrypted data based on the key storage table, as indicated in block 340. It should be appreciated that, because the data is encrypted and only the accelerator device has the key to decrypt the encrypted data, the edge compute device 150 cannot access the encrypted workload received from the client compute device. As such, the encrypted data is securely transferred from the client compute device to the accelerator device without exposing the content of the workload to the edge compute device (e.g., to the processor 212 of the edge compute device 150) hosting the accelerator device. It should be appreciated that, in some embodiments, the edge compute device 150 may determine whether the accelerator 160 has capability to support execution of encrypted workloads prior to sending the encrypted workload. In other words, as described in block 304, the edge compute device 150 may check attestation of the accelerator's trusted computing capabilities again prior to sending the encrypted workload.

Figure 5:
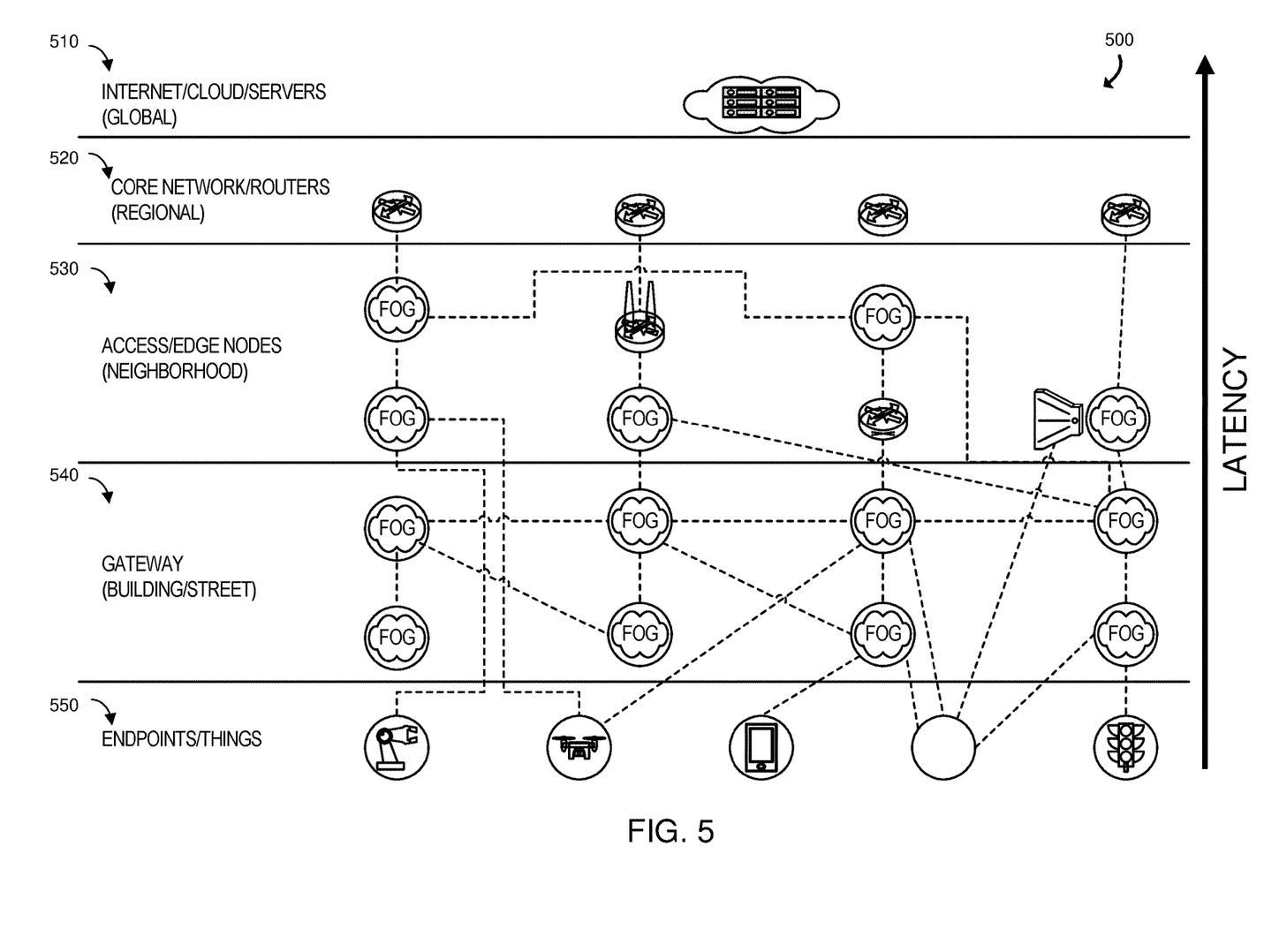
FIG. 5 is a simplified block diagram of a fog and mobile edge computing (MEC) network topology that may be utilized with the system of FIG. 1.

Referring briefly to FIG. 5, a MEC and fog network topology 500 is shown. The network topology 500 includes endpoints (at an endpoints/things network layer 550), gateways (at a gateway layer 540), access or edge computing nodes (e.g., at neighborhood nodes layer 530), core network or routers (e.g., at a regional or central office layer 520). A fog network (e.g., established at the gateway layer 540) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE core network), among others. In this context, FIG. 5 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge, also referred to as a Multi-Access Edge, (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

In addition to the MEC implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes a computing device comprising an accelerator; and one or more processors to determine whether to enable acceleration of an encrypted workload, receive, via an edge network, encrypted data from a client compute device, and transfer the encrypted data to the accelerator without exposing content of the encrypted data to the one or more processors, wherein the accelerator is to receive, in response to a determination to enable the acceleration of the encrypted workload, an accelerator key from a secure server via a secured channel, and process, in response to a transfer of the encrypted data from the one or more processors, the encrypted data using the accelerator key.

Example 2 includes the subject matter of Example 1, and wherein to determine whether to enable acceleration of the encrypted workload comprises to determine whether to enable acceleration of the encrypted workload based on a request received from the client compute device.

Example 3 includes the subject matter of any of Examples 1 and 2, and wherein to determine whether to enable acceleration of the encrypted workload comprises to determine whether to enable acceleration of the encrypted workload based on one or more applications that are presently being executed by the accelerator.

Example 4 includes the subject matter of any of Examples 1-3, and wherein to determine whether to enable acceleration of the encrypted workload comprises to determine whether to enable acceleration of the encrypted workload based on a service level agreement.

Example 5 includes the subject matter of any of Examples 1-4, and wherein to receive the accelerator key from the secure server comprises to receive an accelerator key generated by the secure server in response to a receipt of a request from the client compute device.

Example 6 includes the subject matter of any of Examples 1-5, and wherein to receive the accelerator key from the secure server comprises to receive a tenant identifier of the client compute device requesting the acceleration of the encrypted data.

Example 7 includes the subject matter of any of Examples 1-6, and wherein to receive the encrypted data from a client compute device comprises to receive encrypted data that has been encrypted by the client compute device using a client key associated with the accelerator.

Example 8 includes the subject matter of any of Examples 1-7, and wherein the accelerator is further to determine which accelerator key to use to decrypt the encrypted data based on a tenant identifier associated with the client compute device, wherein the tenant identifier is indicated in the encrypted data.

Example 9 includes the subject matter of any of Examples 1-8, and wherein the encrypted data indicates which accelerator to be used to process the encrypted data.

Example 10 includes one or more machine-readable storage media comprising a plurality of instructions stored thereon that, after being prepared for execution, cause a computing device that executes the prepared instructions to determine whether to enable acceleration of an encrypted workload; receive, in response to a determination to enable the acceleration of the encrypted workload, an accelerator key from a secure server via a secured channel; receive encrypted data from a client compute device; transmit the encrypted data to an accelerator hosted on the computing device without exposing content of the encrypted data to the computing device; and process the encrypted data using the accelerator key.

Example 11 includes the subject matter of Example 10, and wherein to determine whether to enable acceleration of the encrypted workload comprises to determine whether to enable acceleration of the encrypted workload based on a request received from the client compute device.

Example 12 includes the subject matter of any of Examples 10 and 11, and wherein to determine whether to enable acceleration of the encrypted workload comprises to determine whether to enable acceleration of the encrypted workload based on one or more applications that are presently being executed by the accelerator.

Example 13 includes the subject matter of any of Examples 10-12, and wherein to determine whether to enable acceleration of the encrypted workload comprises to determine whether to enable acceleration of the encrypted workload based on a service level agreement.

Example 14 includes the subject matter of any of Examples 10-13, and wherein to receive the accelerator key from the secure server comprises to receive an accelerator key generated by the secure server in response to a receipt of a request from the client compute device.

Example 15 includes the subject matter of any of Examples 10-14, and wherein to receive the accelerator key from the secure server comprises to receive a tenant identifier of the client compute device requesting the acceleration of the encrypted data.

Example 16 includes the subject matter of any of Examples 10-15, and wherein to receive the encrypted data from a client compute device comprises to receive encrypted data that has been encrypted by the client compute device using a client key associated with the accelerator.

Example 17 includes the subject matter of any of Examples 10-16, and wherein the encrypted data indicates a tenant identifier associated with the client compute device.

Example 18 includes the subject matter of any of Examples 10-17, and further including a plurality of instructions that in response to being executed cause the computing device to determine, by the accelerator, which accelerator key to use to decrypt the encrypted data based on the tenant identifier.

Example 19 includes the subject matter of any of Examples 10-18, and wherein the encrypted data indicates which accelerator to be used to process the encrypted data.

Example 20 includes a method comprising determining, by a computing device, whether to enable acceleration of an encrypted workload; receiving, in response to a determination to enable the acceleration of the encrypted workload and by an accelerator of the computing device, an accelerator key from a secure server via a secured channel; receiving, by the computing device, encrypted data from a client compute device; transmitting, by the computing device, the encrypted data to an accelerator hosted on the computing device without exposing content of the encrypted data to the computing device; and processing, by the accelerator, the encrypted data using the accelerator key.

What is claimed is:
1. A computing device comprising:
at least one memory;
instructions in the computing device;
an accelerator; and
one or more processors to execute the instructions to:
  determine whether to enable acceleration of an encrypted workload based on whether the accelerator has compute capabilities to support an execution of the encrypted workload,
  receive, via an edge network, encrypted data from a client compute device, and
  transfer the encrypted data to the accelerator without exposing content of the encrypted data to the one or more processors, wherein the accelerator is to:
  receive, in response to a determination to enable the acceleration of the encrypted workload, an accelerator key from a secure server via a secured channel,
  update an entry in a key storage table to associate a tenant identifier and the accelerator key, the tenant identifier to identify the client compute device transferring the encrypted data, and process, in response to a transfer of the encrypted data from the one or more processors, the encrypted data using the accelerator key, whereby the association of the tenant identifier and the accelerator key is available to subsequently determine which accelerator key of a plurality of accelerator keys to use to process the encrypted data from the client compute device.

2. The computing device of claim 1, wherein to determine whether to enable acceleration of the encrypted workload comprises to determine whether to enable acceleration of the encrypted workload based on a request received from the client compute device.

3. The computing device of claim 1, wherein to determine whether to enable acceleration of the encrypted workload comprises to determine whether to enable acceleration of the encrypted workload based on one or more applications that are presently being executed by the accelerator.

4. The computing device of claim 1, wherein to determine whether to enable acceleration of the encrypted workload comprises to determine whether to enable acceleration of the encrypted workload based on a service level agreement.

5. The computing device of claim 1, wherein to receive the accelerator key from the secure server comprises to receive an accelerator key generated by the secure server in response to a receipt of a request from the client compute device.

6. The computing device of claim 1, wherein to receive the accelerator key from the secure server comprises to receive a tenant identifier of the client compute device requesting the acceleration of the encrypted data.

7. The computing device of claim 1, wherein to receive the encrypted data from a client compute device comprises to receive encrypted data that has been encrypted by the client compute device using a client key associated with the accelerator.

8. The computing device of claim 1, wherein the accelerator is further to determine which accelerator key to use to decrypt the encrypted data based on a tenant identifier associated with the client compute device, wherein the tenant identifier is indicated in the encrypted data.

9. The computing device of claim 1, wherein the encrypted data indicates which accelerator to be used to process the encrypted data.

10. A non-transitory machine-readable storage medium comprising a instructions that, when executed, cause a processor to:
determine whether to enable acceleration of an encrypted workload based on whether an accelerator has compute capabilities to support an execution of the encrypted workload;
receive, in response to a determination to enable the acceleration of the encrypted workload, an accelerator key from a secure server via a secured channel;
receive encrypted data from a client compute device;
transmit the encrypted data to the accelerator hosted on the processor without exposing content of the encrypted data to the processor;
update an entry in a key storage table to associate a tenant identifier and the accelerator key, the tenant identifier to identify the client compute device transferring the encrypted data, and
process the encrypted data using the accelerator key, whereby the association of the tenant identifier and the accelerator key is available to subsequently determine which accelerator key of a plurality of accelerator keys to use to process the encrypted data from the client compute device.

11. The non-transitory machine-readable storage medium of claim 10, wherein the instructions, when executed, cause the processor to determine whether to enable acceleration of the encrypted workload based on a request received from the client compute device.

12. The non-transitory machine-readable storage medium of claim 10, wherein the instructions, when executed, cause the processor to determine whether to enable acceleration of the encrypted workload based on one or more applications that are presently being executed by the accelerator.

13. The non-transitory machine-readable storage medium of claim 10, wherein the instructions, when executed, cause the processor to determine whether to enable acceleration of the encrypted workload based on a service level agreement.

14. The non-transitory machine-readable storage medium of claim 10, wherein the instructions, when executed, cause the processor to receive the accelerator key from the secure server generated by the secure server in response to a receipt of a request from the client compute device.

15. The non-transitory machine-readable storage medium of claim 10, wherein to receive the accelerator key from the secure server includes the instructions to cause the processor to receive a tenant identifier of the client compute device requesting the acceleration of the encrypted data.

16. The non-transitory machine-readable storage medium of claim 10, wherein to receive the encrypted data from a client compute device includes the instructions to cause the processor to receive encrypted data that has been encrypted by the client compute device using a client key associated with the accelerator.

17. The non-transitory machine-readable storage medium of claim 10, wherein the encrypted data indicates a tenant identifier associated with the client compute device.

18. The non-transitory machine-readable storage medium of claim 17, further instructions that, when execute, cause the processor to determine, by the accelerator, which accelerator key to use to decrypt the encrypted data based on the tenant identifier.

19. The non-transitory machine-readable storage medium of claim 10, wherein the encrypted data indicates which accelerator to be used to process the encrypted data.

20. A method comprising:
determining, by a computing device, whether to enable acceleration of an encrypted workload based on whether an accelerator has compute capabilities to support an execution of the encrypted workload;
receiving, in response to a determination to enable the acceleration of the encrypted workload and by the accelerator of the computing device, an accelerator key from a secure server via a secured channel;
receiving, by the computing device, encrypted data from a client compute device;
transmitting, by the computing device, the encrypted data to an accelerator hosted on the computing device without exposing content of the encrypted data to the computing device;
updating, by the accelerator, an entry in a key storage table to associate a tenant identifier and the accelerator key, the tenant identifier to identify the computing device transferring the encrypted data, and
processing, by the accelerator, the encrypted data using the accelerator key, whereby the association of the tenant identifier and the accelerator key is available to subsequently determine which accelerator key of a plurality of accelerator keys to use to process the encrypted data.

21. The method of claim 20, further including determining which accelerator key of the plurality of accelerator keys to use to process the encrypted data.

* * * * *